(12) United States Patent
Peretz et al.

(10) Patent No.: US 9,841,828 B2
(45) Date of Patent: Dec. 12, 2017

(54) PRESSURE SENSITIVE STYLUS

(71) Applicant: Microsoft Technology Licensing, LLC, Redmond, WA (US)

(72) Inventors: Ahia Peretz, Ramat-Gan (IL); Vadim Mishalov, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 15/133,521

(22) Filed: Apr. 20, 2016

(65) Prior Publication Data

US 2017/0308189 A1    Oct. 26, 2017

(51) Int. Cl.
| G06F 3/033 | (2013.01) |
| G06F 3/0354 | (2013.01) |
| G06F 3/038 | (2013.01) |
| G06F 3/041 | (2006.01) |
| G06F 3/044 | (2006.01) |

(52) U.S. Cl.
CPC ........ *G06F 3/03545* (2013.01); *G06F 3/0383* (2013.01); *G06F 3/044* (2013.01); *G06F 3/0414* (2013.01)

(58) Field of Classification Search
CPC ...... G06F 3/0317; G06F 3/033; G06F 3/0338; G06F 3/0346; G06F 3/03545; G06F 3/0383; G06F 3/0414; G06F 3/044; G06K 9/222
USPC ........................................................ 345/179
See application file for complete search history.

(56) References Cited

U.S. PATENT DOCUMENTS

| 4,111,052 | A |  | 9/1978 | Sniderman |
| 4,451,698 | A |  | 5/1984 | Whetstone et al. |
| 4,672,154 | A |  | 6/1987 | Rodgers et al. |
| 5,004,872 | A |  | 4/1991 | Lasley |
| 5,138,118 | A |  | 8/1992 | Russell |
| 5,206,785 | A | * | 4/1993 | Hukashima .......... G01D 5/2417 361/283.2 |
| 5,225,637 | A |  | 7/1993 | Rodgers et al. |
| 5,414,227 | A |  | 5/1995 | Schubert et al. |

(Continued)

FOREIGN PATENT DOCUMENTS

| EP | 0209467 | 1/1987 |
| EP | 2818981 | 12/2004 |

(Continued)

OTHER PUBLICATIONS

Advisory Action Before the Filing of an Appeal Brief dated Sep. 15, 2016 From the US Patent and Trademark Office Re. U.S. Appl. No. 14/395,837.

(Continued)

*Primary Examiner* — Joe H Cheng (57) ABSTRACT

A handheld device includes a housing, an elongated rod movable with respect to the housing, a pyramid structure and a circuit. The elongated rod includes a tip at a first end and a compressible element at a second end. The compressible element includes conductive material configured to press against the electrodes based on a force vector applied on the tip. The pyramid structure includes at least three walls and an electrode on each of the at least three walls and is fixed or integrated with the housing. The circuit transmit signals on the compressible element or the electrodes, detect outputs from the electrodes and provide pressure related information based on the outputs.

20 Claims, 9 Drawing Sheets

(56) References Cited

U.S. PATENT DOCUMENTS

| | | | |
|---|---|---|---|
| 5,528,002 A | 6/1996 | Katabami | |
| 5,565,632 A | 10/1996 | Ogawa | |
| 5,571,997 A | 11/1996 | Gray et al. | |
| 5,576,502 A | 11/1996 | Fukushima et al. | |
| 5,793,360 A | 8/1998 | Fleck et al. | |
| 5,914,708 A | 6/1999 | LaGrange et al. | |
| 6,104,388 A | 8/2000 | Nagai et al. | |
| 6,175,773 B1 | 1/2001 | Reiffel et al. | |
| 6,211,863 B1 | 4/2001 | Chery et al. | |
| 6,232,962 B1 | 5/2001 | Davis et al. | |
| 6,249,234 B1 | 6/2001 | Ely et al. | |
| 6,344,656 B1 | 2/2002 | Hopkins et al. | |
| 6,474,888 B1 | 11/2002 | Lapstun et al. | |
| 6,624,832 B1 | 9/2003 | Thomas | |
| 6,690,156 B1 | 2/2004 | Weiner et al. | |
| 6,707,451 B1 | 3/2004 | Nagaoka | |
| 6,727,439 B2 | 4/2004 | Chao et al. | |
| 6,853,369 B2 | 2/2005 | Fukushima et al. | |
| 6,972,754 B2 | 12/2005 | Zank | |
| 7,145,555 B2 | 12/2006 | Taylor et al. | |
| 7,202,862 B1 | 4/2007 | Palay et al. | |
| 7,210,046 B2 | 4/2007 | Truong | |
| 7,279,646 B2 | 10/2007 | Xu | |
| 7,292,229 B2 | 11/2007 | Morag et al. | |
| 7,367,242 B2 | 5/2008 | Xi et al. | |
| 7,372,455 B2 | 5/2008 | Perski et al. | |
| 7,436,397 B2 | 10/2008 | Zank | |
| 7,778,795 B2 | 8/2010 | Fukushima et al. | |
| 7,843,439 B2 | 11/2010 | Perski et al. | |
| 7,955,017 B2 | 6/2011 | Lapstun et al. | |
| 8,199,132 B1 | 6/2012 | Oda et al. | |
| 8,212,795 B2 | 7/2012 | Henry | |
| 8,228,299 B1 | 7/2012 | Maloney et al. | |
| 8,481,872 B2 | 7/2013 | Zachut | |
| 8,536,471 B2 | 9/2013 | Stern et al. | |
| 8,629,358 B2 | 1/2014 | Rimon et al. | |
| 8,674,967 B2 * | 3/2014 | Fukushima | G01D 5/208 178/19.03 |
| 8,686,964 B2 | 4/2014 | Rimon | |
| 8,711,130 B2 * | 4/2014 | Fukushima | G06F 3/03545 178/18.01 |
| 8,780,089 B2 | 7/2014 | Yuan et al. | |
| 8,878,823 B1 | 11/2014 | Kremin et al. | |
| 8,913,041 B2 * | 12/2014 | Fukushima | G06F 3/03545 345/179 |
| 9,063,591 B2 | 6/2015 | Alameh et al. | |
| 9,116,558 B2 | 8/2015 | Yilmaz et al. | |
| 9,122,322 B2 | 9/2015 | Stern et al. | |
| 9,158,393 B2 | 10/2015 | Vlasov | |
| 9,218,073 B1 | 12/2015 | Kremin et al. | |
| 9,702,778 B2 * | 7/2017 | Horie | G01L 1/142 |
| 2001/0038384 A1 * | 11/2001 | Fukushima | G06F 3/03545 345/179 |
| 2002/0040817 A1 | 4/2002 | LeKuch et al. | |
| 2004/0001052 A1 | 1/2004 | Zank | |
| 2005/0110777 A1 | 5/2005 | Geaghan et al. | |
| 2005/0166076 A1 | 7/2005 | Truong | |
| 2005/0195387 A1 | 9/2005 | Zhang et al. | |
| 2006/0068851 A1 | 3/2006 | Ashman, Jr. | |
| 2006/0109252 A1 | 5/2006 | Kolmykov-Zotov et al. | |
| 2006/0267966 A1 | 11/2006 | Grossman et al. | |
| 2007/0014490 A1 | 1/2007 | Silverbrook et al. | |
| 2007/0085836 A1 | 4/2007 | Ely | |
| 2007/0146351 A1 | 6/2007 | Katsurahira et al. | |
| 2007/0176909 A1 | 8/2007 | Pavlowski | |
| 2007/0180923 A1 * | 8/2007 | Liu | G06F 3/03545 73/780 |
| 2008/0128180 A1 | 6/2008 | Perski et al. | |
| 2009/0078476 A1 | 3/2009 | Rimon et al. | |
| 2009/0114459 A1 | 5/2009 | Fukushima et al. | |
| 2009/0122029 A1 | 5/2009 | Sin | |
| 2009/0262637 A1 | 10/2009 | Badaye et al. | |
| 2009/0289922 A1 | 11/2009 | Henry | |
| 2010/0006350 A1 | 1/2010 | Elias | |
| 2010/0051356 A1 | 3/2010 | Stern et al. | |
| 2010/0084203 A1 | 4/2010 | Peng | |
| 2010/0107770 A1 | 5/2010 | Serban et al. | |
| 2010/0155153 A1 | 6/2010 | Zachut | |
| 2010/0214252 A1 | 8/2010 | Wu | |
| 2011/0090146 A1 | 4/2011 | Katsurahira | |
| 2011/0192658 A1 * | 8/2011 | Fukushima | G06F 3/03545 178/19.03 |
| 2012/0050231 A1 | 3/2012 | Westhues et al. | |
| 2012/0228039 A1 | 9/2012 | Hinson et al. | |
| 2012/0253699 A1 | 10/2012 | Kuno | |
| 2012/0327040 A1 | 12/2012 | Simon et al. | |
| 2013/0141398 A1 | 6/2013 | Cho et al. | |
| 2013/0265265 A1 | 10/2013 | Stern | |
| 2013/0321355 A1 | 12/2013 | Teiblum | |
| 2014/0002422 A1 | 1/2014 | Stern et al. | |
| 2014/0019070 A1 | 1/2014 | Dietz et al. | |
| 2014/0132529 A1 | 5/2014 | Jeong | |
| 2014/0210781 A1 | 7/2014 | Stern | |
| 2014/0218343 A1 | 8/2014 | Hicks et al. | |
| 2015/0054757 A1 | 2/2015 | Kuroda | |
| 2015/0070316 A1 | 3/2015 | Oda et al. | |
| 2015/0070330 A1 | 3/2015 | Stern | |
| 2015/0116289 A1 | 4/2015 | Stern et al. | |
| 2015/0317001 A1 | 11/2015 | Ben-Bassat et al. | |
| 2015/0370354 A1 | 12/2015 | Stern et al. | |
| 2016/0124530 A1 | 5/2016 | Stern | |
| 2016/0188008 A1 * | 6/2016 | Horie | G01L 1/142 345/179 |
| 2016/0231833 A1 | 8/2016 | Gu et al. | |
| 2017/0045961 A1 | 2/2017 | Stern | |
| 2017/0045962 A1 | 2/2017 | Stern et al. | |
| 2017/0068345 A1 | 3/2017 | Barel | |

FOREIGN PATENT DOCUMENTS

| | | |
|---|---|---|
| EP | 2187288 | 5/2010 |
| EP | 2204724 | 7/2010 |
| EP | 2339432 | 6/2011 |
| EP | 1349056 | 7/2011 |
| EP | 2650758 | 10/2013 |
| JP | 6-119101 | 4/1994 |
| JP | 03-327056 | 9/2002 |
| WO | WO 01/24157 | 4/2001 |
| WO | WO 02/41129 | 5/2002 |
| WO | WO 2009/143046 | 11/2009 |
| WO | WO 2010/086035 | 8/2010 |
| WO | WO 2012/123951 | 9/2012 |
| WO | WO 2013/160887 | 10/2013 |
| WO | WO 2015/027017 | 2/2015 |
| WO | WO 2014/043239 | 3/2015 |
| WO | WO 2016/020818 | 2/2016 |

OTHER PUBLICATIONS

Communication Relating to the Results of the Partial International Search dated Oct. 13, 2015 From the International Searching Authority Re. Application No. PCT/IB2015/055863.

Communication Relating to the Results of the Partial International Search dated Jul. 25, 2012 From the International Searching Authority Re. Application No. PCT/IL2012/050095.

International Preliminary Report on Patentability dated Nov. 6, 2014 From the International Bureau of WIPO Re. Application No. PCT/IL2012/050143.

International Preliminary Report on Patentability dated Sep. 26, 2013 From the International Bureau of WIPO Re. Application No. PCT/IL2012/050095.

International Search Report and the Written Opinion dated Mar. 6, 2014 From the International Searching Authority Re. Application No. PCT/IL2013/050836.

International Search Report and the Written Opinion dated Sep. 7, 2012 From the International Searching Authority Re. Application No. PCT/IL2012/050095.

International Search Report and the Written Opinion dated Jan. 16, 2013 From the International Searching Authority Re. Application No. PCT/IL2012/050143.

(56) References Cited

OTHER PUBLICATIONS

International Search Report and the Written Opinion dated Jan. 26, 2016 From the International Searching Authority Re. Application No. PCT/IB2015/055863.
Invitation to Pay Additional Fees dated May 31, 2016 From the International Preliminary Examining Authority Re. Application No. PCT/IB2015/055863.
Notice of Allowance dated Feb. 3, 2015 From the US Patent and Trademark Office Re. U.S. Appl. No. 13/908,063.
Notice of Allowance dated Mar. 22, 2013 From the US Patent and Trademark Office Re. U.S. Appl. No. 12/546,753.
Official Action dated Jul. 3, 2012 From the US Patent and Trademark Office Re. U.S. Appl. No. 12/546,753.
Official Action dated Jun. 3, 2014 From the US Patent and Trademark Office Re. U.S. Appl. No. 13/908,063.
Official Action dated May 5, 2016 From the US Patent and Trademark Office Re. U.S. Appl. No. 14/395,837.
Official Action dated May 6, 2016 From the US Patent and Trademark Office Re. U.S. Appl. No. 14/451,448.
Official Action dated Oct. 8, 2015 From the US Patent and Trademark Office Re. U.S. Appl. No. 14/395,837.
Official Action dated Dec. 19, 2013 From the US Patent and Trademark Office Re. U.S. Appl. No. 13/908,063.
Official Action dated Oct. 19, 2012 From the US Patent and Trademark Office Re. U.S. Appl. No. 12/546,753.
Official Action dated Oct. 21, 2015 From the US Patent and Trademark Office Re. U.S. Appl. No. 14/451,448.
Official Action dated Feb. 22, 2016 From the US Patent and Trademark Office Re. U.S. Appl. No. 14/839,985.
Official Action dated Nov. 25, 2014 From the US Patent and Trademark Office Re. U.S. Appl. No. 14/005,308.
Official Action dated Jan. 31, 2012 From the US Patent and Trademark Office Re. U.S. Appl. No. 12/546,753.
Written Opinion dated Sep. 2, 2016 From the International Preliminary Examining Authority Re. Application No. PCT/IB2015/055863.
Hoffman "Not All Tablet Styluses Are Equal: Capacity, Wacom, and Bluetooth Explained", How-to-Geek, 4 P., Sep. 12, 2013.
IBM "Automatic Switching Stylus for Pen-Based Computer Systems", IBM Technical Disclosure Bulletin, XP000419075, 36(12): 583-584, Dec. 1, 1993.
Jones "Stylus Reviews: TrueGlide Apex Review", iPad for Artists, 4 P., Nov. 21, 2013.
Song et al. "Grips and Gestures on a Multi-Touch Pen", Proceedings of the SIGCHI Conference on Human Factors in Computing Systems, CHI'11, Session: Flexible Grips & Gestures, Vancouver, BC, Canada, May 27-12, 2011, p. 1323-1332, May 2011.
International Preliminary Report on Patentability dated Oct. 19, 2016 From the International Preliminary Examining Authority Re. Application No. PCT/IB2015/055863.
International Search Report and the Written Opinion dated Nov. 21, 2016 From the International Searching Authority Re. Application No. PCT/US2016/045661. (13 Pages).
Official Action dated Dec. 19, 2016 From the US Patent and Trademark Office Re. U.S. Appl. No. 14/848,527. (34 pages).
Official Action dated Jan. 20, 2017 From the US Patent and Trademark Office Re. U.S. Appl. No. 15/335,517. (15 pages).
Restriction Official Action dated Mar. 1, 2017 From the US Patent and Trademark Office Re. U.S. Appl. No. 14/930,815. (5 pages).
Restriction Official Action dated Feb. 17, 2017 From the US Patent and Trademark Office Re. U.S. Appl. No. 14/702,726. (6 pages).
Official Action dated Mar. 24, 2017 From the US Patent and Trademark Office Re. U.S. Appl. No. 14/702,726. (48 pages).
Official Action dated Apr. 12, 2017 From the US Patent and Trademark Office Re. U.S. Appl. No. 15/338,549. (43 pages).
Official Action dated Apr. 14, 2017 From the US Patent and Trademark Office Re. U.S. Appl. No. 14/930,815. (44 pages).
International Search Report and the Written Opinion dated Jun. 26, 2017 From the International Searching Authority Re. Application No. PCT/US2017/026881. (13 Pages).
Official Action dated Jul. 13, 2017 From the US Patent and Trademark Office Re. U.S. Appl. No. 15/338,549. (29 pages).
Official Action dated Jul. 19, 2017 From the US Patent and Trademark Office Re. U.S. Appl. No. 14/930,815. (17 pages).

\* cited by examiner

PRESSURE SENSITIVE STYLUS

BACKGROUND

Digitizer systems are used as computer input devices for capturing data, handwritten signatures, text, drawings, symbols and the like. Digitizing tablets and touch-screens are exemplary digitizer systems used to replace a mouse as a primary pointing and navigation device for desktop computers. A user interacts with the digitizer system by positioning and moving an object such as stylus and/or a finger over a sensing surface of the system, e.g. a tablet and/or a touch screen. Position of the object with respect to the sensing surface is tracked by the digitizer system and interpreted as a user command.

SUMMARY

Users are typically known to hold a stylus at an angle, e.g. 20-40 degree angle while interacting with a sensing surface of a computing device. During interaction, force is applied on a writing tip of the stylus in both an axial and cross-axial direction of the stylus due to contact pressure with the sensing surface. Force in the axial direction may lead to retraction of the writing toward the stylus housing while the force in the cross-axial direction leads to tilting or bending of the writing tip. The cross-axial forces are typically significant and may be larger than the axial forces.

According to some embodiments of the present disclosure, there is provided a stylus that is sensitive to both axial and cross-axial forces applied on the writing tip.

In some exemplary embodiments, the stylus provides for detecting both direction and amplitude of force applied on the writing tip while a user uses the stylus to write, draw or point at objects displayed on a screen.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

A stylus or other handheld device for interacting with the digitizer sensor can be a passive conductive object or an active device that transmits a signal. An electromagnetic stylus is one type of stylus known in the art for operating a digitizer system. The electromagnetic stylus emits an electromagnetic signal that may be picked up at locations on a sensing surface of the digitizer system. Position of a writing tip of the stylus may be tracked based on signals transmitted by the stylus via the writing tip while the writing tip is either touching or hovering over the sensing surface. Inking based on the tracked position of the stylus may be displayed on a display while the stylus is touching the sensing surface. A thickness of a line for inking may be sensitive to pressure applied on the writing tip during inking.

According to some exemplary embodiments, pressure applied on the writing tip is detected with a pressure sensor integrated in the stylus. Typically, the pressure detected or information related to the detected pressure is reported by the stylus. A controller of the digitizer system or a computing device associated with the digitizer system receives the report and provides the information to a controller associated with the display.

According to some embodiments of the present disclosure, a stylus includes a pressure sensor that is sensitive to both tilting and retraction of its writing tip. Known pressure sensors for styluses typically sense retraction of the writing tip due to contact pressure against an interaction surface, e.g. a touch screen. However, a user typically holds a stylus at an angle with respect to the interaction surface and therefore the force applied on the writing tip is not solely in the axial direction. The writing tip may even bend or tilt due to the contact force before retracting toward the stylus housing. Pressure sensing may be improved by detecting force in both axial and cross-axial direction with respect to longitudinal axis of the stylus. Optionally, sensitivity in detecting when the writing tip first touches a sensing surface may be improved by detecting both the axial and cross-axial force. Improving the sensitivity improves the ability to accurately detect transition between a hovering and touch state of the stylus.

In some exemplary embodiments, the pressure sensor includes an elastic or compressible element with conductive material and a pyramid structure including electrodes. Both the electrodes on the pyramid structure and the elastic element are typically connected to a circuit in the stylus. Typically, the elastic element is rounded, e.g. spherically or hemi-spherically shaped. In some exemplary embodiments, the elastic element is fixed onto one end of the writing tip and the pyramid structure is fixed or integrated on housing of the stylus. Alternatively, the pyramid structure is fixed or integrated on one end of the writing tip and the elastic element is fixed to the housing of the stylus.

As the writing tip retracts and tilts, the elastic element is configured to press and flatten against one or more inner walls of the pyramid structure. The elastic element may flatten against each of the walls with varying degrees based on a direction of the tilt. The amount of flattening depends on both the magnitude and direction of the applied force as well as the elasticity of the elastic element. Outputs from the circuit connected to the electrodes may be detected. According to some embodiments of the present disclosure, outputs from the circuit are related to both force applied on the writing tip and a direction of the applied force. The relationship is typically defined based on empirical data.

In some exemplary embodiments, the pyramid structure includes electrodes coated with isolating material and flattening of the elastic element increases capacitive coupling between the elastic element and one or more of the electrodes on the pyramid structure. Alternatively or additionally, the elastic element is coated with isolating material. Outputs detected from the electrodes may be representative of the capacitive coupling between the elastic element and each of the walls of the pyramid.

In some exemplary embodiments, a plurality of electrodes is patterned on an inner wall of the pyramid structure and the electrodes are exposed. Flatting of the elastic element may increase the number of electrodes in electrical contact with the elastic element. In these embodiments, the circuit may be connected to each of the electrodes patterned on the walls and the outputs may be representative of the number of shorts created between the electrodes due to flattening of the elastic element against the electrodes.

In some exemplary embodiments, the pyramid structure includes both exposed electrodes and electrodes coated with isolating material with capacitive coupling between them. Flatting of the elastic element may increase the area of an effective area of exposed electrode which increases the capacitance.

In some exemplary embodiments, the elastic element or the electrode includes material that changes resistivity based on force or contact area between the electrode and the elastic element. Optionally, resistivity is detected and related to a force vector applied on the writing tip.

In some exemplary embodiments, the elastic element is connected to a distal end of the writing tip and enclosed in a double pyramid. In a neutral state of the writing tip, when no force is applied, the elastic element may rests against the inner walls of one pyramid and when pressure is applied on the writing tip, the elastic element may move together with the writing tip and press against the inner walls of the other pyramid.

Optionally, the elastic element is capacitively coupled to walls of each pyramid of the double pyramid and the circuit detects capacitive coupling from each of the walls. In some exemplary embodiments, force applied on the writing tip is related to a difference between outputs detected on each of the pyramids forming the double pyramid.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings. The disclosure is capable of other embodiments or of being practiced or carried out in various ways.

Figure 1A:
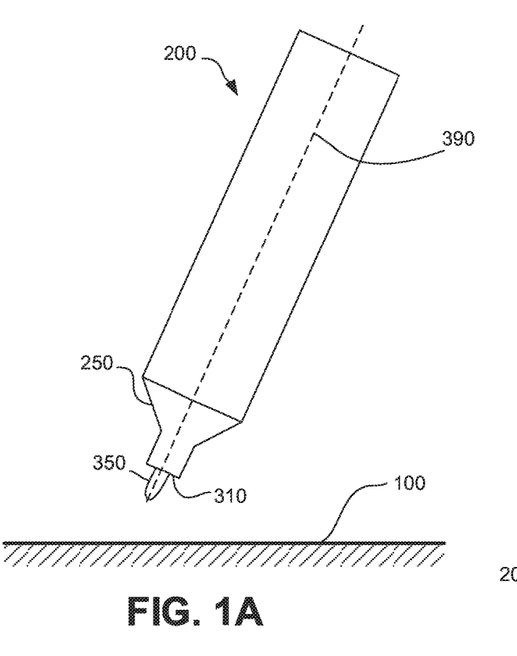
FIGS. 1A and 1B are simplified schematic drawings of an exemplary stylus including a pressure sensitive writing tip, the writing tip shown while hovering and touching a surface respectively in accordance with some embodiments of the present disclosure.
Figure 1B:
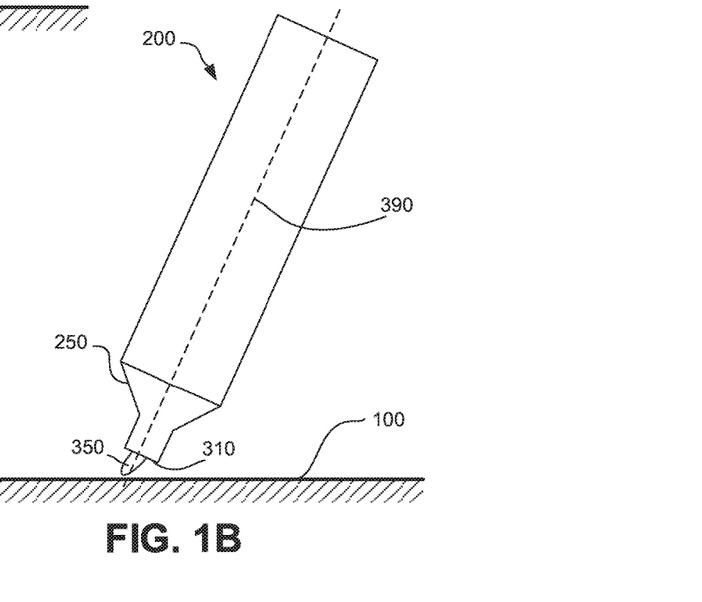

Reference is now made to FIGS. 1A and 1B showing simplified schematic drawings of an exemplary stylus including a pressure sensitive writing tip, the writing tip shown while hovering and touching a surface respectively in accordance with some embodiments of the present disclosure. According to embodiments of the present disclosure, a writing tip 350 is sensitive to force applied in a direction along axis 390 and also to force applied at an angle with respect to axis 390. Depending on the angle of stylus 200 during interaction with a sensing surface, writing tip 350 may begin to bend or tilt before retracting along axis 390.

Writing tip 350 is typically aligned with a longitudinal axis 390 of a housing 250 of a stylus 200 and has some degree of freedom to move in both the direction of longitudinal axis 390 and in a direction perpendicular to longitudinal axis 390. Typically, writing tip 350 is an elongated element that extends into housing 250 through collar 310. When writing tip 350 is held at an angle against surface 100, the force applied on writing tip 350 may tilt writing tip 350 against collar 310 of housing 250 as well as push writing tip 350 toward housing 250. Typically, a thickness of collar 310 as well as its positioning in relation to a length of writing tip 350 defines a range of tilt movement that the writing tip 350 has in response to force applied on writing tip 350. According to some exemplary embodiments, a pressure sensor embedded in housing 250 is configured to sense the force applied on writing tip 350. The pressure sensor senses both force applied in the longitudinal direction, along axis 390 as well as forces applied in directions perpendicular to the longitudinal direction.

Figure 2A:
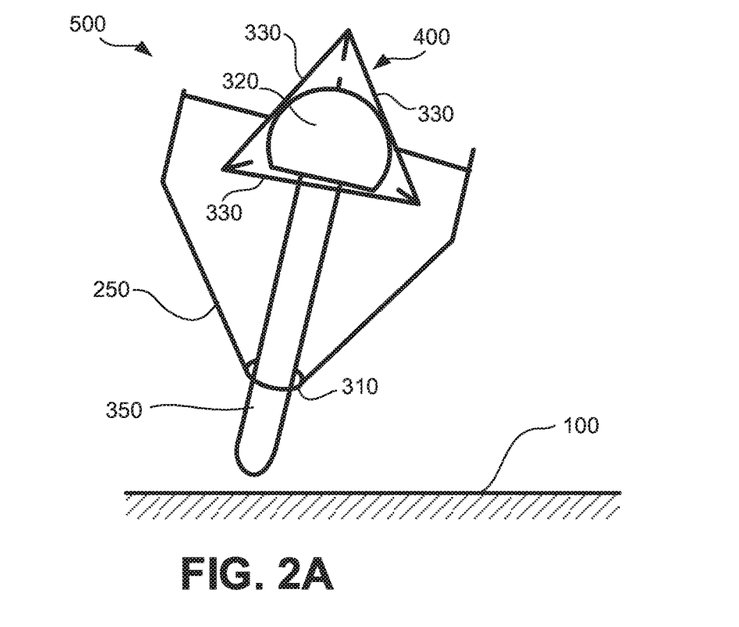
FIGS. 2A and 2B are simplified schematic drawings of structural elements of an exemplary pressure sensor while the stylus is hovering and touching the surface respectively in accordance with some embodiments of the present disclosure.
Figure 2B:
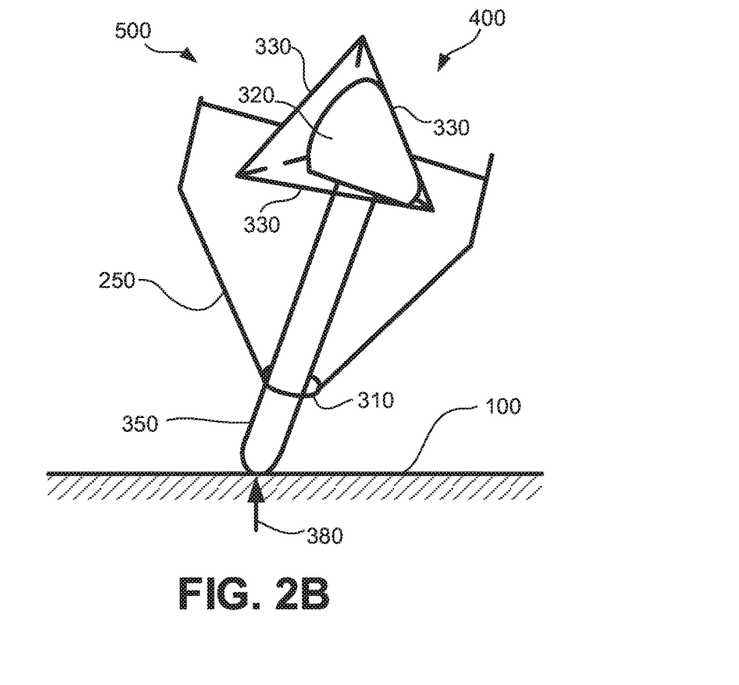

Reference is now made to FIGS. 2A and 2B showing simplified schematic drawings of structural elements of an exemplary pressure sensor while the stylus is hovering over a surface and touching the surface respectively in accordance with some embodiments of the present disclosure. According to some exemplary embodiments of the present disclosure, a pressure sensor 500 includes an elastic element 320 that moves in relation to a pyramid structure 400. Pyramid structure 400 is typically integrated or secured to housing 250 and elastic element 320 is typically mounted or integrated on one end of writing tip 320. Elastic element 320 may be fitted into or aligned to face inner walls of pyramid structure 400.

Pyramid structure 400 includes at least three walls 330 surrounding elastic structure 320. Elastic element 320 is conductive and typically has a rounded shape. Walls 330 include one or more electrodes that may sense capacitive or electrical coupling with elastic element 320. Optionally, one or both of elastic element 320 and walls 330 are coated with electrically isolating material for sensing capacitive coupling. Optionally, conductive material of both elastic element 320 and the conductive material on walls 330 are exposed to detect electrical coupling. Examples of the electrodes that may be included on walls 330 are depicted in FIGS. 4A, 4B, 4C, and 4D and discussed herein below in reference to in FIGS. 4A, 4B, 4C, and 4D.

As writing tip 350 is pushed and tilted due to contact force applied from surface 100, elastic element 320 moves with respect to walls 330 and flattens against walls 330 (FIG. 2B). Tilting of writing tip 350 may lead to elastic element 320 flattening against only one or two of walls 330, e.g. asymmetric flattening. Recession of writing tip 350 may lead to elastic element 320 flattening symmetrically against all walls 330. Typically, writing tip 350 recedes and tilts and elastic element 320 may flatten against some of walls 330 more than other walls 330. In some exemplary embodiments, in a neutral state of writing tip 350 when no pressure is applied on writing tip 350 (FIG. 2A), there is no physical contact between elastic element 320 and walls 330. Optionally, elastic element 320 is positioned in relation to pyramid structure 400 to contact walls 330 when a threshold pressure level on writing tip 350 is reached. Alternatively, contact between elastic element 320 and walls 330 is already established in the neutral state of writing tip 350.

According to some exemplary embodiments, movement of elastic element 320 towards and away from the walls 330 as well as deformation of elastic element 320 are detected based on changes in the capacitive or electrical coupling with the electrodes on walls 330.

Pyramid structure 400 is schematically depicted as being transparent in the figures for convenience so that position of elastic element 320 in relation to pyramid structure 400 is visible in the figures. Typically, pyramid structure 400 is not required to be transparent.

Figure 3A:
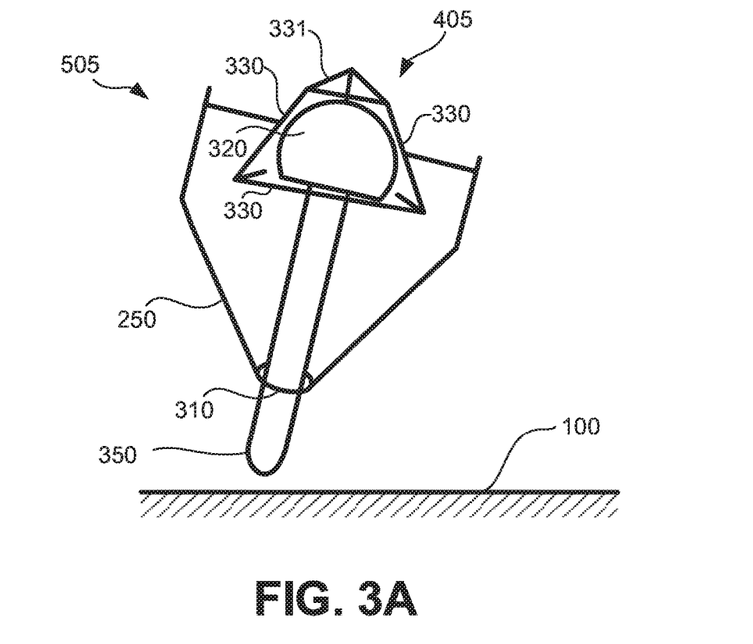
FIGS. 3A and 3B are simplified schematic drawings of structural elements of the exemplary pressure sensor while the stylus is hovering and touching the surface respectively in accordance with some other embodiments of the present disclosure.
Figure 3B:
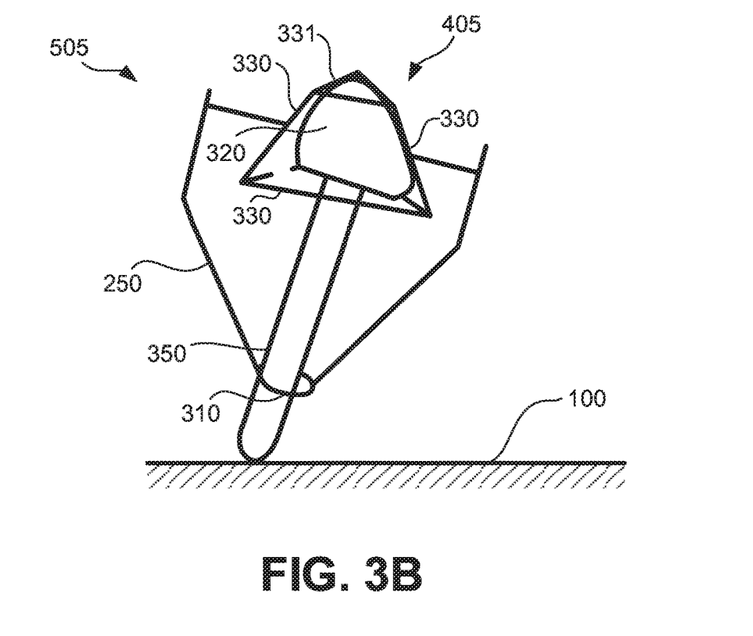

Reference is now made to FIGS. 3A and 3B showing simplified schematic drawings of structural elements of the exemplary pressure sensor while the stylus is hovering and touching the surface respectively in accordance with some other embodiments of the present disclosure. In some exemplary embodiments, a pressure sensor 505 includes elastic element 320 that moves in relation to a pyramid structure 405. Pyramid structure 405 is a truncated pyramid including an additional surface 331 formed from truncating the peak. As writing tip 350 recedes into housing 250 due to contact pressure, elastic element 320 may flatten against surface 331 as well as against walls 330. Typically, axial movement of writing tip 350 may lead to elastic element 320 flattening against surface 331 as well as each of walls 330 in a symmetrical manner. Tilting of writing tip 350 may typically lead to elastic element 320 flattening against some of walls 330 of pyramid structure 405 more than other walls 330. Optionally, axial force may be detected based on outputs from an electrode on surface 331 and cross-axial force may be detected based on comparing outputs from walls 330.

Figure 4A:
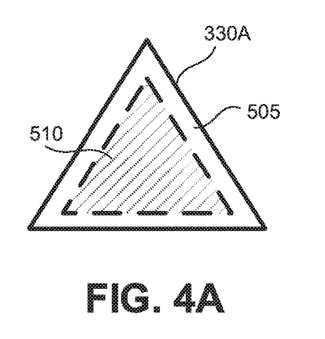
FIGS. 4A, 4B, 4C and 4D are simplified drawings of exemplary electrodes of the pressure sensor in accordance with some embodiments of the present disclosure.

Reference is now made to FIGS. 4A, 4B, 4C and 4D showing simplified drawings of exemplary electrodes of the pressure sensor in accordance with some embodiments of the present disclosure. According to some exemplary embodiments, electrodes are mounted or patterned on walls of a pyramid structure, e.g. pyramid structures shown in FIGS. 2A and 3A. Referring now to FIG. 4A, in some exemplary embodiments, each of the walls 330 of the pyramid structure includes an electrode 510 spread over wall 330A that is covered with electrically isolating material 505. Electrode 510 may be triangular in shape or may have other shapes, e.g. circular or rectangular. A circuit connected to electrode 510 may sense capacitive coupling between elastic element 320 (shown in FIGS. 2A, 2B, 3A and 3B) that is configured to press against the walls of the pyramid structure and electrode 510. Typically, capacitive coupling increases as elastic element 320 flattens against electrode 510. Output from each of electrodes 510 in the pyramid structure may be detected to determine pressure applied on writing tip 350. In addition, outputs may be compared to determine direction of force applied on writing tip. Optionally, tilt angle of writing tip 350 may be determined based on the determined direction of force.

Figure 4B:
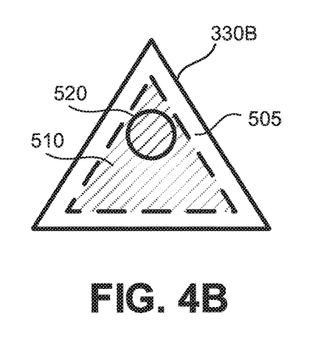

Referring now to FIG. 4B, in some exemplary embodiments, a pyramid structure includes walls 330B with an electrode 510 that is covered with electrically isolating material 505 as discussed in reference to FIG. 4A as well as an exposed electrode 520. Exposed electrode may be patterned over isolating coating 505. A circuit may be connected to each of electrode 510 and electrode 520 in wall 330B. Both capacitive coupling and electrical contact with elastic element 320 may be detected. Contact between elastic element 320 and electrode 520 may be detected by the circuit and may provide indication that a threshold level of pressure is being applied on writing tip 350. Optionally, the threshold level is indicative of a transition between a hovering mode of the stylus and a touch (or pen-down) mode of the stylus. Further pressure applied on writing tip 350 may push elastic element 320 against a wall 330 and the increased contact surface area may increase capacitive coupling between elastic element 320 and electrode 510. This change in capacitive coupling may be detected together with output from electrode 520.

Figure 4C:
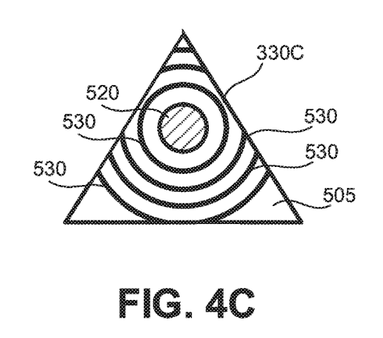

Referring now to FIG. 4C in some exemplary embodiments, a pyramid structure includes walls 330C. Walls 330C may include exposed electrode 520 together with an array of exposed electrodes 530 that are electrically isolated from one another. Exposed electrode 530 may be aligned to an initial location of contact between elastic element 320 and wall 330C. In some exemplary embodiments, a circuit connected to each of electrodes 520 and 530 detects a short between the electrodes due to contact with elastic element 320. As elastic element 320 is pushed against walls 330C and flattens, the number of shorts between electrode 520 and electrodes 530 increases. In some exemplary embodiments, pressure applied on each of walls 330C in the pyramid structure is related to the number of electrodes 530 that are shorted with electrode 520. Based on output from each of walls 330C, pressure as well as direction of force or tilt angle may be determined.

Figure 4D:
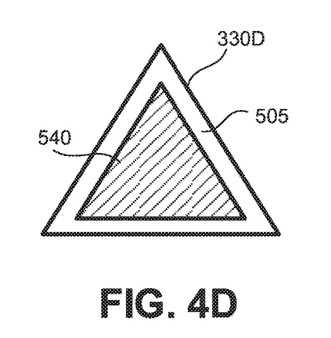

Referring now to FIG. 4D, in some exemplary embodiments, a pyramid structure include walls 330D. Wall 330D includes a single exposed electrode 540. A circuit connected to electrode 540 may sense contact with elastic element 320.

Optionally, at least one of electrode 540 and elastic element 320 is formed with material that changes resistivity based on force or contact area between electrode 540 and elastic element 320 and the circuit measures resistance. Optionally, wall 330D is only used for surface 331 (FIG. 3A).

Figure 5:
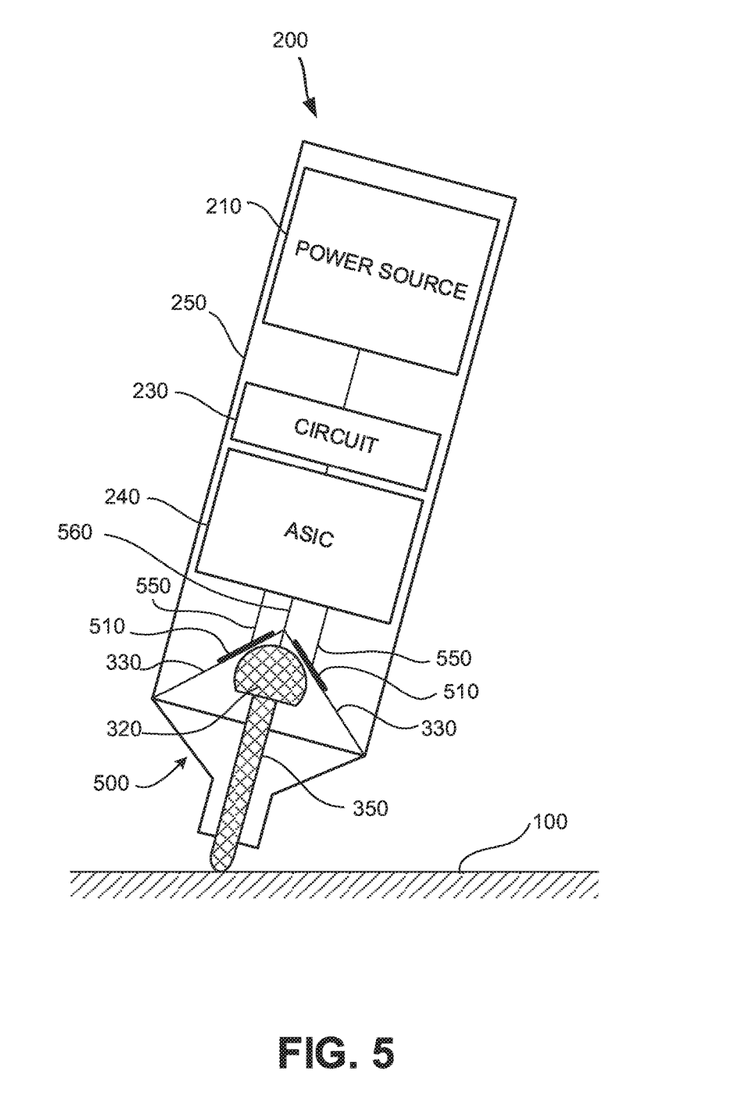
FIG. 5 is a simplified schematic block diagram showing components of a pressure sensitive stylus in accordance with some embodiments of the present disclosure.

Reference is now made to FIG. 5 showing a simplified schematic block diagram of components of a pressure sensitive stylus in accordance with some embodiments of the present disclosure. Stylus 200 can be an active stylus that self-generates a transmitting signal with or without receiving a triggering signal from a digitizer system or from another source. Stylus 200 can alternatively be a semi-passive stylus that includes a resonator arrangement that is activated in response to receiving a trigger signal from a digitizer system. Stylus 200 typically includes a transmitter that transmits a signal that can be picked up by digitizer sensing surface 100. Optionally, writing tip 350 operates as an antenna for the transmitter, so that a position of writing tip 350 is detected and tracked on digitizer sensing surface 100.

For an active stylus 200, the signal is generated by a signal generator and powered by power source 210. Power source 210 may include for example, one or more batteries and/or a super capacitor. The signal transmitted by stylus 200 may be signal bursts, e.g. AC signal bursts transmitted at a pre-defined frequency or pattern. The signal bursts may be a modulated signal that includes encoded information regarding an operational state of the stylus 200 and pressure information. The transmitter is electrically connected to writing tip 350 by a connection 560 for transmission via writing tip 250. In some exemplary embodiments, the transmitter additionally includes reception ability to provide two-way communication, e.g. with a digitizer system. Typically, the signal generator and transmitter are integrated on ASIC 240 and in supporting analog circuit 230. ASIC 240 may additionally provide processing and memory capability. ASIC 240 together with analog circuit 230 make up the circuitry for stylus 200. ASIC 240 may also typically function as a controller for controlling operation of stylus 200.

According to some embodiments of the present disclosure, stylus 200 includes a tip pressure sensor 500 that is integrated with writing tip 350. Pressure sensor 500 senses when pressure is applied on writing tip 350, e.g. during interaction with a digitizer sensor. Output from tip pressure sensor 500 may be encoded on the signal transmitted by stylus 200. Typically, output from tip pressure sensor 500 provides for differentiating between a hover operational state, defined by writing tip 350 hovering over an interaction surface and a touch operational state, e.g. a pen-down state defined by writing tip 350 pressing against the interaction surface as when writing.

According to some embodiments of the present disclosure, tip pressure sensor 500 includes elastic element 320 that is conductive and a plurality of electrodes 510 positioned on walls 330 forming a pyramid structure. ASIC 240 may be electrically connected to each of electrodes 510 by a connection 550. Typically, elastic element 320 is electrically connected to writing tip 350 so that signals transmitted on writing tip 350 are also transmitted on elastic element 320. Pressure sensing with pressure sensor 500 is based on sensing changes in electrical or capacitive coupling between elastic element 320 and electrodes 510 as proximity of elastic element 320 to walls 330 changes.

In some exemplary embodiments, ASIC 240 may sample output from electrodes 510 in synchronization with transmitting signals via writing tip 350. The signals transmitted via writing tip 350 during pressure sensing may be signals dedicated for pressure sensing or may be same signals that ASIC 240 generates and transmits for tracking on the digitizer sensor. Optionally, ASIC 240 may transmit as well as sample signals on electrodes 510 to sense capacitive or electrical coupling of electrodes 510 with elastic element 320. Output may be encoded in the stylus signal and reported to a digitizer system or device communicating with stylus 200. In some exemplary embodiments, output sampled is processed by ASIC 240 to detect and report one or more of pressure applied on writing tip 350, direction of force applied on writing tip 350, and toggling between hover and touch operational mode.

Alternatively, raw output from sensor 500 may be reported and processing to determine pressure or direction of force may be performed by a processor associated with the digitizer system that receives the stylus signal.

Figure 6:
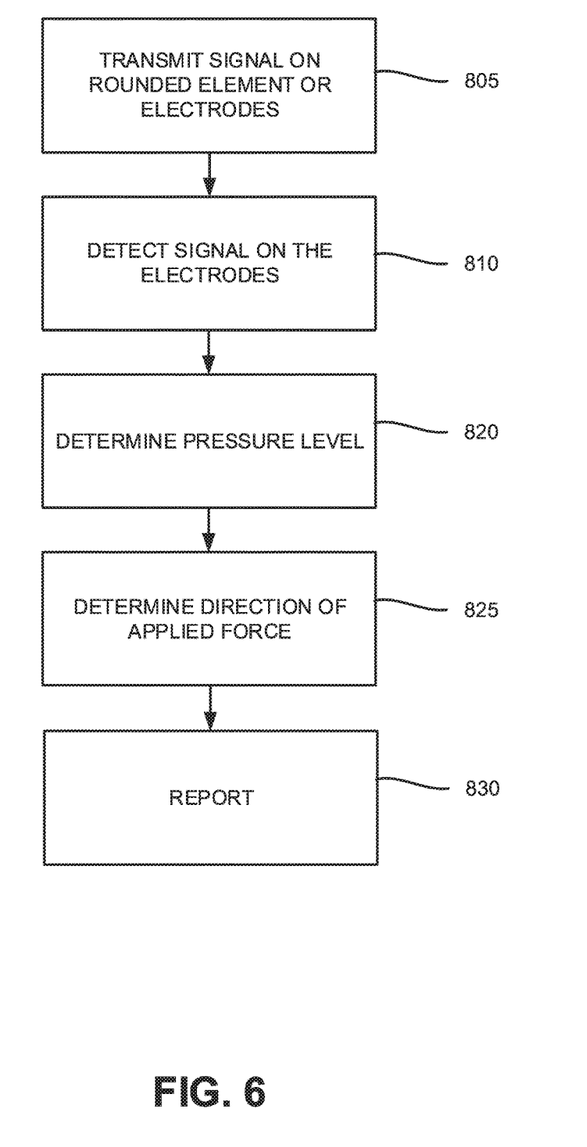
FIG. 6 is a simplified flow chart of an exemplary method for sensing pressure applied on a writing tip of a stylus in accordance with some embodiments of the present disclosure.

Reference is now made to FIG. 6 showing a simplified flow chart of an exemplary method for sensing pressure with the pressure sensor in accordance with some embodiments of the present disclosure. According to some exemplary embodiments, a circuit embedded in a stylus transmits a signal on elastic element 320 or electrodes of pyramid structure (block 805). The circuit detects outputs from the electrodes in response to transmitting the signal (block 810). The outputs detected may indicate a level of capacitive coupling with elastic element 320 or may indicate electrical contact with elastic element 320. Pressure applied on writing tip 350 may be determined based on a summation of the level of capacitive coupling detected from each of the electrodes (block 820). A direction of the applied force may be determined based on differences in capacitive coupling detected from each of the electrodes (block 825). Output from the pressure sensor, e.g. magnitude and direction of the force applied on the writing tip, may be reported to a device in communication with the stylus (block 830). Typically, the output is reported to a controller of a digitizer system tracking the stylus or directly to a stylus enabled computing device receiving input from the digitizer system. Optionally, the output may also be used by the stylus to adjust its operation. In some exemplary embodiments, output from the pressure sensor is reported to a wake-up circuit included in the stylus. The wake-up circuit may activate a portion of the circuit of the stylus based on detecting pressure applied on the writing tip.

Figure 7:
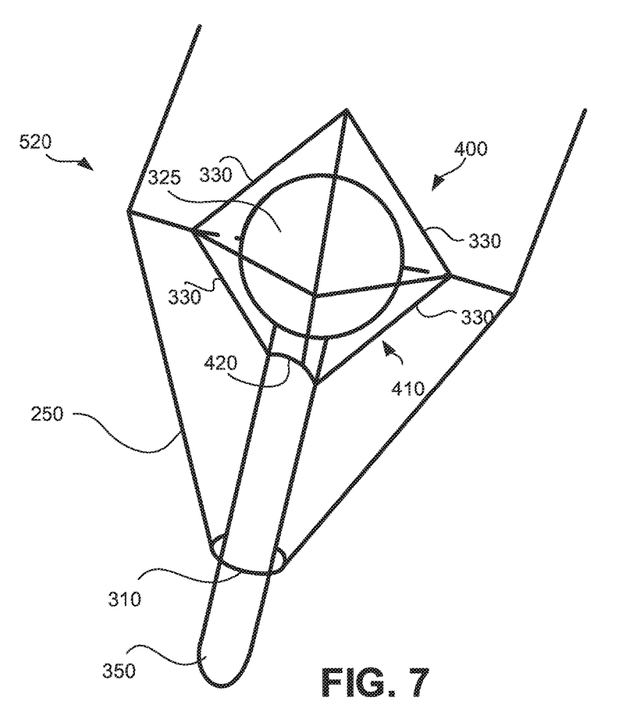
FIG. 7 is a simplified schematic drawing of structural elements of the exemplary pressure sensor in accordance with yet other embodiments of the present disclosure.
Figure 8A:
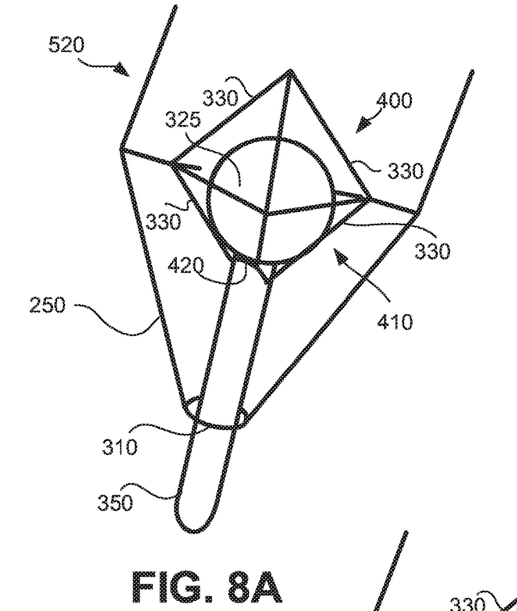
FIGS. 8A and 8B are simplified schematic drawings of the structural elements of the exemplary pressure sensor while the stylus is hovering over a surface and touching the surface respectively in accordance with the yet other embodiments of the present disclosure.
Figure 8B:
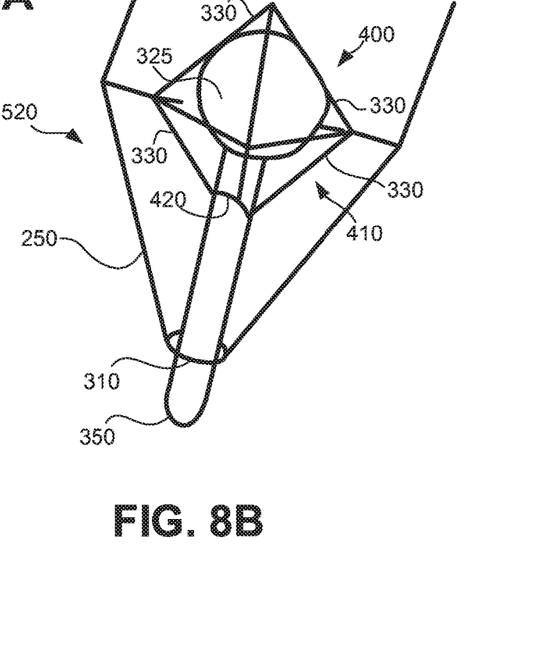

Reference is now made to FIG. 7 showing a simplified schematic drawing of structural elements of the exemplary pressure sensor and to FIGS. 8A and 8B showing simplified schematic drawings of the structural elements of the exemplary pressure sensor while the stylus is hovering over a surface and touching the surface respectively in accordance with the yet other embodiments of the present disclosure.

According to some exemplary embodiments of the present disclosure, a pressure sensor 520 includes an elastic element 325 that moves in relation to a double pyramid structures, e.g. pyramid structure 400 and pyramid structure 410 that together form a hexahedron. Alternatively, pyramid structure 400 and pyramid structure 410 may fixed to have a gap between them. Each of pyramid structures 400 and 410 is typically integrated or secured to housing 250. Writing tip 350 with elastic element 325 may be fitted through a hole or bore 420 in pyramid structure 410. Bore 420 may be large enough to allow axial and tilting movement of writing tip 350 with respect to pyramid structure 410. Elastic element 325 may be substantially enclosed by the pyramid structures so that any movement of elastic element 320 may be detected by one of the pyramid structures 400 and 410. Each of pyramid structure 400 and pyramid structure 410 include walls 330 with electrodes selected from the electrodes discussed in reference to FIGS. 4A, 4B, 4C, and 4D. In some exemplary embodiments, elastic element 325 is supported by lower pyramid structure 410 during a neutral state of writing tip 350, when no contact force is applied on writing tip 350 (FIG. 8A). In this neutral state, elastic element 325 may be in physical contact with each of walls 330 of lower pyramid structure 410 and not in physical contact with any of walls 330 of upper pyramid structure 400. When contact pressure is applied on writing tip 350, writing tip 350 may recede into housing 250 and elastic element 325 may advance toward upper pyramid structure 400 (FIG. 8B). Contact between elastic element 320 and lower pyramid structure 410 may be severed based on elastic element 325 advancing toward upper pyramid structure 400. Alternatively, elastic element 325 may be in physical contact with both pyramid structure 400 and 410 at all pressure levels but at varying degrees. In a neutral state, contact with walls 330 of upper pyramid structure 400 may be minimal. When pressure is applied, elastic element 325 may flatten against walls 330 of upper pyramid structure 400 so that the contact area is increased. Based on the change in contact area, capacitive coupling or electrical coupling between the elastic element 320 and electrodes on the pyramid structures 400 and 410 may change. The change may be detectable by circuitry of stylus 200. Elastic element 325 may be spherical or symmetrical in shape.

Figure 9:
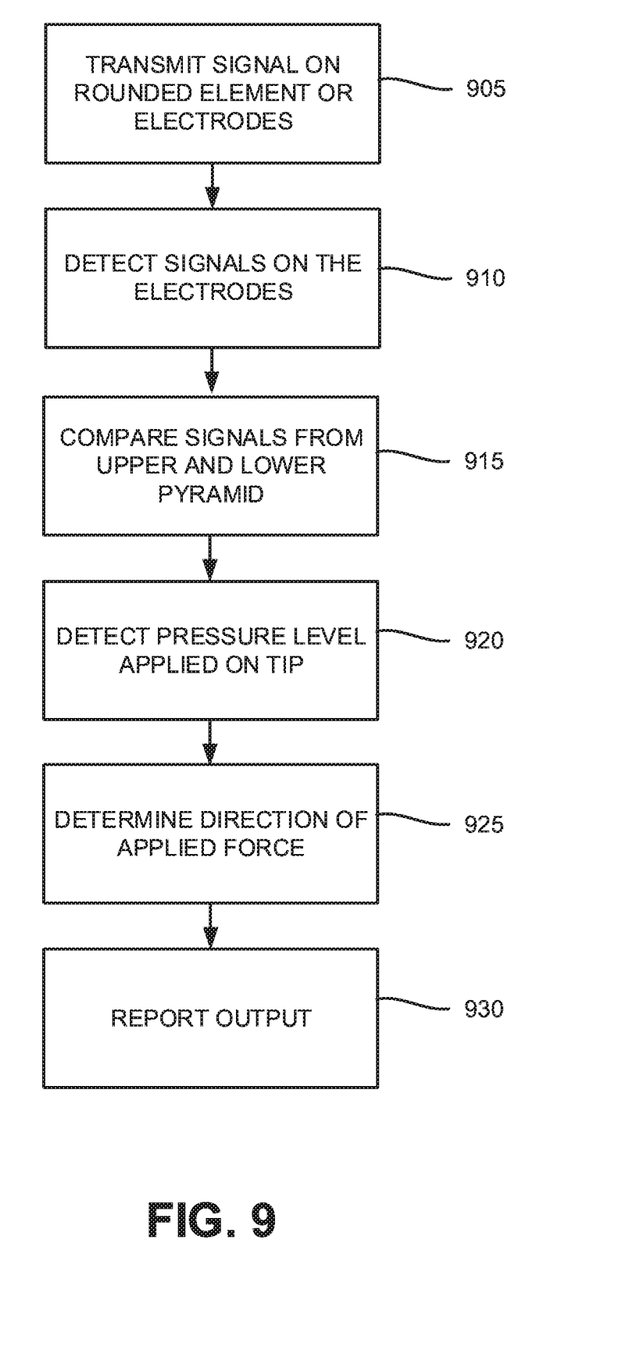
FIG. 9 is a simplified flow chart of another exemplary method for sensing pressure with the pressure sensor in accordance with the yet other embodiments of the present disclosure.

Reference is now made to FIG. 9 showing a simplified flow chart of another exemplary method for sensing pressure with the pressure sensor in accordance with the yet other embodiments of the present disclosure. According to some exemplary embodiments, a signal is transmitted on elastic element 325 or the electrodes positioned on a pair of pyramid structures (block 905). Signals on each of the electrodes positioned on the pair of pyramid structures is detected (block 910). Signals detected from electrodes on one of the pyramid structures are compared with signals detected in corresponding electrodes on the other pyramid structure of the pair (block 915). Contact pressure applied on writing tip 350 may be detected based on difference between outputs from the upper and lower pyramid structure (block 920). When detecting pressure based on differences between signals, noises common to signals measured on each of the pyramid structures may be cancelled. Direction of applied force on the writing tip may be based on differences between outputs from different walls on a same pyramid structure (block 925). Output from sensor 520 is typically reported to a device (digitizer system or stylus enabled device) in communication with the stylus (block 930).

According to an aspect of some exemplary embodiments there is provided a handheld device comprising: a housing; an elongated rod including a tip at a first end and a compressible element at a second end, wherein the compressible element includes conductive material, and wherein the elongated rod is movable with respect to the housing; a pyramid structure including at least three walls and an electrode on each of the at least three walls, wherein the pyramid structure is fixed or integrated with the housing, and wherein the compressible element is configured to press against the electrodes based on a force vector applied on the tip; and a circuit configured to: apply signals on the compressible element or the electrodes; detect outputs from the electrodes; and provide pressure related information based on the outputs.

Optionally, the pyramid structure or the compressible element includes isolation material configured to establish capacitive coupling between the electrodes on the pyramid structure and the compressible element during physical contact between the compressible element and the pyramid structure.

Optionally, the circuit is configured to detect capacitive coupling between the compressible element and each of the electrodes.

Optionally, the circuit is configured to detect electrical coupling between the compressible element and each of the electrodes.

Optionally, the circuit is configured to detect a direction of the force vector based on the outputs from the electrodes.

Optionally, the pyramid structure is a truncated pyramid structure including at least three walls and an additional surface formed from truncating the peak and wherein the additional surface includes an additional electrode.

Optionally, the device comprises a pair of pyramid structures arranged to form a hexahedron, each pyramid structure of the pair including at least three walls and an electrode on each of the at least three walls, wherein each of the pyramid structure is fixed or integrated with the housing.

Optionally, the compressible element is supported on a first pyramid structure of the pair while the tip has no force vector applied on it and is pushed against the second pyramid structure of the pair based on the force vector.

Optionally, the compressible element is compressed between the first pyramid structure and the second pyramid while the tip has no force vector applied on it and is pushed against the second pyramid structure and pulled away from the lower pyramid of the pair based on the force vector.

Optionally, a first pyramid structure of the pair includes a bore and the rod is fitted through the bore.

Optionally, the circuit is configured to detect differences between outputs from electrodes of the first pyramid structure and the second pyramid structure of the pair, and to provide pressure related information based on the differences.

According to an aspect of some exemplary embodiments there is provided a method comprising: providing a handheld device including a housing and an elongated rod that is movable with respect to the housing, wherein the elongated rod includes a tip at a first end and a compressible element at a second end, the compressible element including conductive material; detecting outputs from at least three electrodes, each electrode of the at least three electrodes positioned on a wall of a pyramid structure, the pyramid structure fixed to the housing, wherein the outputs detected is sensitive to movement of the elongated rod and pressing of the compressible material against the electrodes; and reporting pressure related information based on the outputs to a computing device communicating with the handheld device or applying the pressure related information for adjusting operation of the handheld device or applying the pressure related information for adjusting operation of the handheld device.

Optionally, the outputs detected are based on capacitive coupling between the compressible element and the at least three electrodes.

Optionally, wherein the outputs detected is based on electrical coupling between the compressible element and each of the electrodes.

Optionally, the pressure related information is a force vector applied on the tip, where a direction of the force vector is detected based on differences in the outputs from the at least three electrodes.

Optionally, the outputs detected are based on a signal transmitted on the rod, wherein the rod and the compressible element are electrically connected.

Optionally, the outputs detected is based on a signal transmitted on each of the at least three electrodes.

Optionally, the pyramid structure is a truncated pyramid structure including at least three walls and an additional surface formed from truncating the peak and wherein the additional surface includes an additional electrode.

Optionally, the method comprises detecting outputs from at least three additional electrodes positioned on walls of a second pyramid structure, the second pyramid structure forming a hexahedron with the first pyramid structure.

Optionally, the method comprises detecting differences between outputs from electrodes of the first pyramid structure and the second pyramid structure; and providing pressure related information based on the differences.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A handheld device comprising:
   a housing;
   an elongated rod including a tip at a first end and a compressible element at a second end, wherein the compressible element includes conductive material, and wherein the elongated rod is movable with respect to the housing;
   a pyramid structure including at least three walls and an electrode on each of the at least three walls, wherein the pyramid structure is fixed or integrated with the housing, and wherein the compressible element is configured to be placed in the pyramid structure and to press against the electrodes based on a force vector applied on the tip; and
   a circuit configured to:
      apply signals on the compressible element or the electrodes;
      detect outputs from the electrodes; and
      provide pressure related information based on the outputs.

2. The handheld device of claim 1, wherein the pyramid structure or the compressible element includes isolation material configured to establish capacitive coupling between the electrodes on the pyramid structure and the compressible element during physical contact between the compressible element and the pyramid structure.

3. The handheld device of claim 2, wherein the circuit is configured to detect capacitive coupling between the compressible element and each of the electrodes.

4. The handheld device of claim 1, wherein the circuit is configured to detect electrical coupling between the compressible element and each of the electrodes.

5. The handheld device of claim 1, wherein the circuit is configured to detect a direction of the force vector based on the outputs from the electrodes.

6. The handheld device of claim 1, wherein the pyramid structure is a truncated pyramid structure including at least three walls and an additional surface formed from truncating the peak and wherein the additional surface includes an additional electrode.

7. The handheld device of claim 1, comprising a pair of pyramid structures arranged to form a hexahedron, each pyramid structure of the pair including at least three walls and an electrode on each of the at least three walls, wherein each of the pyramid structure is fixed or integrated with the housing.

8. The handheld device of claim 7, wherein the compressible element is supported on a lower pyramid structure of the pair while the tip has no force vector applied on it and is pushed against an upper pyramid structure of the pair based on the force vector.

9. The handheld device of claim 7, wherein the compressible element is compressed between a lower pyramid structure and an upper pyramid while the tip has no force vector applied on it and is pushed against the second pyramid structure and pulled away from the lower pyramid of the pair based on the force vector.

10. The handheld device of claim 7, wherein a lower pyramid structure of the pair includes a bore and the elongated rod is fitted through the bore.

11. The handheld device of claim 7, wherein the circuit is configured to detect differences between outputs from electrodes of a lower pyramid structure and an upper pyramid structure of the pair, and to provide pressure related information based on the differences.

12. A method comprising:
   providing a handheld device including a housing and an elongated rod that is movable with respect to the housing, wherein the elongated rod includes a tip at a first end and a compressible element at a second end, the compressible element including conductive material;
   detecting outputs from at least three electrodes, each electrode of the at least three electrodes positioned on a wall of a pyramid structure, the pyramid structure fixed to the housing, wherein the outputs detected are sensitive to movement of the elongated rod and pressing of the compressible material in the pyramid structure against the electrodes which are positioned on the walls; and
   reporting pressure related information based on the outputs to a computing device communicating with the handheld device or applying the pressure related information for adjusting operation of the handheld device.

13. The method of claim 12, wherein the outputs detected are based on capacitive coupling between the compressible element and the at least three electrodes.

14. The method of claim 12, wherein the outputs detected are based on electrical coupling between the compressible element and each of the electrodes.

15. The method of claim 12, wherein the pressure related information is a force vector applied on the tip, where a direction of the force vector is detected based on differences in the outputs from the at least three electrodes.

16. The method of claim 12, wherein the outputs detected are based on a signal transmitted on the elongated rod, wherein the elongated rod and the compressible element are electrically connected.

17. The method of claim 12, wherein the outputs detected are based on a signal transmitted on each of the at least three electrodes.

18. The method of claim 12, wherein the pyramid structure is a truncated pyramid structure including at least three walls and an additional surface formed from truncating the peak and wherein the additional surface includes an additional electrode.

19. The method of claim 12, comprises a pair of pyramid structures arranged to form a hexahedron; and further comprising:
   detecting outputs from at least three additional electrodes positioned on walls of a second pyramid structure of the pair of pyramid structures.

20. The method of claim 19, further comprising:
   detecting differences between outputs from electrodes of the first pyramid structure and the second pyramid structure of the pair of pyramid structures; and
   providing pressure related information based on the differences.

* * * * *